United States Patent [19]
Clark et al.

[11] 3,853,776
[45] Dec. 10, 1974

[54] LOW POUR POINT FLUIDS AND BLENDS CONTAINING SAME

[75] Inventors: Frank S. Clark, St. Louis, Mo.; Walter Fink, Ruschlikon, Switzerland

[73] Assignee: Monsanto Company, St. Louis, Mo.

[22] Filed: June 14, 1973

[21] Appl. No.: 370,116

Related U.S. Application Data

[62] Division of Ser. No. 293,662, Sept. 29, 1972, Pat. No. 3,767,691.

[52] U.S. Cl................ 252/46.3, 252/49.6, 252/78, 260/448.2
[51] Int. Cl............................................. C10m 3/48
[58] Field of Search..................... 252/46.3, 49.6, 78

[56] References Cited
UNITED STATES PATENTS

| | | | |
|---|---|---|---|
| 3,114,759 | 12/1963 | Lewis............................. | 252/49.6 X |
| 3,354,194 | 11/1967 | Kaufman....................... | 252/49.6 X |
| 3,537,997 | 11/1970 | Wright.......................... | 252/49.6 C |
| 3,751,367 | 8/1973 | Clark et al.................... | 252/46.3 X |

OTHER PUBLICATIONS
Chem. Abstracts, Vol. 54, pg. 1,378e.

*Primary Examiner*—H. Sneed
*Attorney, Agent, or Firm*—Robert E. Wexler

[57] ABSTRACT

Compounds of the formula

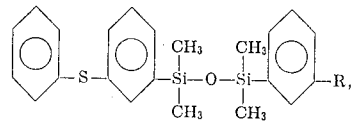

wherein R represents hydrogen or

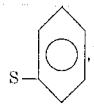

have utility as low temperature lubricants and as pour point depressants for low temperature lubricant blends.

6 Claims, No Drawings

LOW POUR POINT FLUIDS AND BLENDS CONTAINING SAME

This is a division, of application Ser. No. 293,622, filed Sept. 29, 1972, now U.S. Pat. No. 3,767,691.

BACKGROUND OF THE INVENTION

This invention relates to new compounds having utility as pour point depressants and to compositions containing such compounds in admixture with polyphenyl thioethers or polyphenyl ethers-thioethers and mixtures thereof having utility as low temperature lubricants.

During the past decade, the advent of more sophisticated space technology and space vehicles derived therefrom has led to increasing demands on functional fluids, especially lubricants. In the environment of space, lubricants must function at higher and lower temperatures than ever before and it has therefore been necessary that new lubricants be found which will operate at low temperatures and to modify known low temperature fluids so that they will be effective at lower temperatures.

PRIOR ART

The following known prior art is pertinent to the present invention: The compound

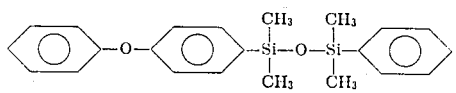

is disclosed at Chemical Abstracts, Vol. 54, p. 1,378E. The compound has a melting point of −42°, a boiling point of 370° to 380°, a refractive index of 1.0387 and a density of 1.5324.

U.S. Pat. No. 3,114,759 discloses the compound para-bis-phenoxyphenyl tetramethyl disiloxane in Example 2 thereof.

SUMMARY OF THE INVENTION

In accordance with the present invention, it has been found that compounds of the formula

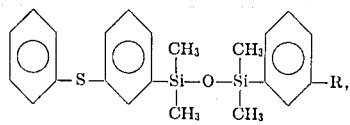

are useful as low pour point lubricants having low evaporation properties and that such compounds may be added to polyphenyl thioether lubricant compositions to depress the pour point of such compositions.

The compounds of the present invention are distinguished from the prior art in that they contain no oxygen-linked phenyl groups and the phenyl linkages, in relation to each other, are meta-oriented, rather than para-oriented. The compounds of the present invention are fluid at lower temperatures than compounds of the prior art and may be thus incorporated into polyphenyl thioether compositions to give a lower pour point to such compositions than would similar compounds shown in the prior art.

Accordingly, the objective of this invention is to provide new disiloxane compounds useful as low pour point lubricants having evaporation loss characteristics comparable to similar polyphenyl thioether lubricants and to provide new low pour point lubricant blends containing such compounds.

DESCRIPTION OF THE PREFERRED EMBODIMENTS

The compounds of the present invention are prepared as follows:

When R = hydrogen, the compound of the invention is prepared by reacting phenyl magnesium chloride with excess dimethyldichlorosilane to afford phenyldimethylchlorosilane, which is then reacted with (m-phenylmercaptophenyl)dimethylchlorosilane in the presence of water to afford 1-(m-phenylmercaptophenyl)-3-phenyl-1,1,3,3-tetramethyldisiloxane.

When

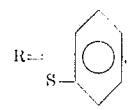

the compound is prepared by the reaction of the Grignard reagent of m-chlorophenyl phenyl sulfide with dimethyldichlorosilane to afford (m-phenylmercaptophenyl) dimethylchlorosilane. The latter compound is then hydrolyzed by standard methods to afford 1,3-bis(m-phenylmercaptophenyl) tetramethyldisiloxane.

The term "pour point" is defined as that temperature at which a liquid becomes non-flowing due to high viscosity.

The lubricant base stock to which the compounds of the present invention are added in order to depress the pour point thereof, without significant evaporative loss, are mixtures of polyphenyl thioethers with polyphenyl ether/thioethers. Illustrative lubricant blends to which the pour point depressants of the present invention may be added include the following:

1. a blend comprising:
   a. m-bis(phenylmercapto)benzene (30%)
   b. m-3-phenoxydiphenyl sulfide (30%)
   c. diphenyl sulfide (10%)
2. a blend comprising:
   a. m-bis(phenylmercapto)benzene (50%)
   c. 3,3'-bis(phenylmercapto)diphenyl ether (10%)
and similar blends.

In order to determine the effect of the compounds of the present invention as pour point depressants and in order to evaluate the above blends into which they are incorporated, the lubricant blends are tested in a specially designed apparatus for measuring low temperature pour points. Also, the evaporation losses of these blends are found using ASTM modified procedure D972 at 400°F. and 760 mm. for 6½ hours. The results of testing blends 1 and 2 are set forth in the table below.

TABLE

| Blend | Pour Point, °F. | Evap. Loss (%) |
|---|---|---|
| Control* | −22 | 10 |
| 1 | −50 | 30 |
| 2 | −39 | 11 |
| * Ingredient | | Wt. (%) |
| m-bis(phenylmercapto)benzene | | 50 |
| bis(m-phenoxyphenyl) sulfide | | 12.5 |
| (m-phenoxyphenyl)(m-phenylmercaptophenyl) sulfide | | 23.5 |
| bis(m-phenylmercaptophenyl) sulfide | | 12.65 |

TABLE-Continued

| Blend | Pour Point, °F. | Evap. Loss (%) |
| --- | --- | --- |
| 3 and 5 ring thioethers | | 1.35 |

The control also contains 10 ppm. of a dimethyl silicone antifoam agent (Dow-Corning - 200, 350 cs. fluid).

The lubricating properties of blends 1 and 2 are substantially equivalent, as characterized by slow speed four ball tests, to the control and other similar polyphenyl thioether lubricating fluids. It should be noted, however, that the addition of the siloxane compounds of the present invention imparts unusually significant pour point depressing properties to the lubricant fluid and, as especially regards blend 2, low evaporation loss.

Additionally, the oxidative stability of lubricant fluids containing the disiloxane compounds of the present invention is comparable to standard polyphenyl thioether lubricants.

Blend 1 contains 20 percent 1,3-bis(m-phenylmercaptophenyl)tetramethyldisiloxane and 10 percent 1-(m-phenylmercaptophenyl)-3-phenyltetramethyldisiloxane as pour point depressants.

Blend 2 contains 30 percent 1,3-bis(m-phenylmerecaptophenyl)tetramethyldisiloxane and 10 percent 1-(m-phenylmercaptophenyl)-3-phenyltetramethyldisiloxane as pour point depressants.

A lubricant comprising 80 percent 1-(m-phenylmercaptophenyl)-3-phenyltetramethyldisiloxane and 20 percent 1,3-bis-(m-phenylmercaptophenyl)tetramethyldisiloxane has a pour point of —59°F. and an evaporation loss (400°F., 6½ hour, 760 mm.) of 22 percent.

The following examples illustrate specific embodiments of the preparation of the novel compounds of this invention.

EXAMPLE 1

Synthesis of (m-Phenylmercaptophenyl)dimethylchlorosilane

A mixture of magnesium metal (40 grams), dimethyldichlorosilane (17 g.), and tetrahydrofuran (38 ml.) is heated to 40°C. under a nitrogen blanket. To this mixture is added, over seven hours, a mixture of m-chlorophenyl phenyl sulfide (300 g.), dimethyldichlorosilane (576 g.), and 110 ml. of tetrahydrofuran. After stirring at about 50°C. for 14 hours and refluxing at 78°C. for 1 hour, the reaction is cooled and filtered. Unreacted halide and silane are stripped to a pot temperature of 105°C. After another filtration, the filtrate is vacuum distilled, giving 137 g. (37 percent) of (m-phenylmercaptophenyl)dimethylchlorosilane (b.p. 142°-4°/0.3).

EXAMPLE 2

Synthesis of 1-(m-pnenylmercaptophenyl-3-phenyl-1,1,3,3-tetramethyldisiloxane (m-Phenylmercaptophenyl)dimethylchlorosilane (85 g.) and phenyldimethylchlorosilane (52.1 g.) are mixed and added to 209 ml. of water and 261 ml. of ether. This mixture is refluxed for four hours. Vacuum distillation of the dried organic layer affords 46.6 g. of (1-m-phenylmercaptophenyl)-3-phenyl-1,1,3,3-tetramethyldisiloxane (b.p. 175°/0.35).

EXAMPLE 3

Synthesis of 1,3-Bis(m-phenylmercaptophenyl)tetramethyldisiloxane (m-Phenylmercaptophenyl)dimethylchlorosilane (203.6 g.) is added to 310 ml. of water and 388 ml. of ether. After 4 hours of reflux, distillation of the dried organic layer affords 160 g. of the tetramethyldisiloxane (b.p. 252°/0.6).

While the invention has been described by referring to certain specific embodiments, it is not so limited since many modifications and variations are possible in the light of the above teachings. The invention may therefore be practiced otherwise than as specifically described without departing from the spirit and scope thereof.

The embodiments of this invention in which an exclusive property or priviledge is claimed are defined as follows:

1. A low pour point lubricant composition comprising a polyphenyl thioether, a polyphenyl ether-thioether and mixtures thereof and at least one compound of the formula

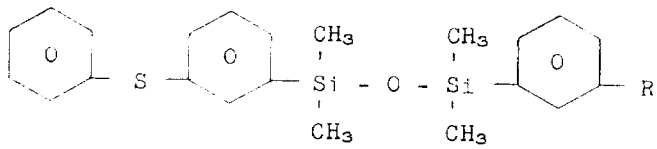

wherein R represents hydrogen or

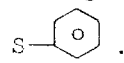

2. A low pour point lubricant composition comprising a polyphenyl ether-thioether, a polyphenyl thioether, and mixtures thereof and the compound of claim 1 wherein R represents hydrogen.

3. A low pour point lubricant composition comprising a polyphenyl ether-thioether, a polyphenyl thioether, and mixtures thereof and the compound of claim 1 wherein R represents

4. A low pour point lubricant composition consisting essentially of about 50 percent m-bis(phenylmercapto)benzene, about 30 percent 1,3-bis(m-phenylmercaptophenl)tetramethyldisiloxane, about 10 percent 1-(m-phenylmercaptophenyl)-3-phenyltetramethyldisiloxane and about 10 percent 3,3'-bis-(phenylmercapto)diphenyl ether.

5. A low pour point lubricant composition consisting essentially of about 30 percent m-bis(phenylmercapto)benzene, about 30 percent m-3-phenoxydiphenyl sulfide, about 10 percent diphenyl sulfide, about 20 percent 1,3-bis(m-phenylmercaptophenyl)tetramethyldisiloxane and about 10 percent 1-(m- phenylmercaptophenyl)-3-phenyltetramethyldisiloxane.
6. The method of depressing the pour point of a lubricant composition comprising a polyphenyl ether-thioether and a polyphenyl thioether which comprises incorporating therein an effective depressant amount of at least one compound of the formula
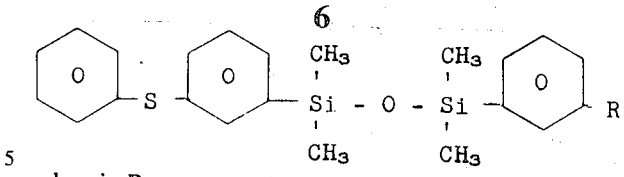
wherein R represents hydrogen or
.
* * * * *

UNITED STATES PATENT OFFICE
CERTIFICATE OF CORRECTION

PO-1050 (5/69)

Patent No. 3,853,776   Dated December 10, 1974

Inventor(s) Frank S. Clark et al.

It is certified that error appears in the above-identified patent and that said Letters Patent are hereby corrected as shown below:

Column 1, line 35, "-42°" should be -- -42°C. -- .

Column 1, line 36, "370° to 380°" should be
-- 370° to 380°C. -- .

Column 2, line 44, "c." should be -- b. -- .

Column 3, headings in TABLE-Continued read:
"Blend    Pour Point, °F.    Evap. Loss (%)"

and should be -- * Ingredient    Wt. (%) -- .

Column 3, line 64, "142°-4°/0.3)."
should be -- 142-4°C./0.3). -- .

Column 3, line 67, "1-(m-pnenylmercaptophenyl-3-phenyl-"
should be -- 1-(m-phenylmercaptophenyl-3-phenyl- -- .

Column 4, line 7, "(b.p. 175°/0.35)."
should be -- (b.p. 175°C./0.35). -- .

Column 4, line 16, "(b.p. 252°/0.6)."
should be -- (b.p. 252°C./0.6). -- .

Column 4, line 59, "phenylmercaptophenl)"
should be -- phenylmercaptophenyl) -- .

Signed and sealed this 18th day of March 1975.

(SEAL)
Attest:

RUTH C. MASON
Attesting Officer

C. MARSHALL DANN
Commissioner of Patents
and Trademarks